United States Patent
Stewart et al.

(10) Patent No.: US 7,216,547 B1
(45) Date of Patent: May 15, 2007

(54) PRESSURE SENSOR WITH SILICON FRIT BONDED CAP

(75) Inventors: Carl E. Stewart, Plano, TX (US); Gilberto Morales, Arlington, TX (US)

(73) Assignee: Honeywell International Inc., Morristown, NJ (US)

( * ) Notice: Subject to any disclaimer, the term of this patent is extended or adjusted under 35 U.S.C. 154(b) by 15 days.

(21) Appl. No.: 11/328,415

(22) Filed: Jan. 6, 2006

(51) Int. Cl.
G01L 7/00 (2006.01)
(52) U.S. Cl. .................. 73/756; 73/753; 257/415
(58) Field of Classification Search ............ 73/753, 73/756; 257/415, 417
See application file for complete search history.

(56) References Cited

U.S. PATENT DOCUMENTS

| | | | | |
|---|---|---|---|---|
| 5,459,351 A | * | 10/1995 | Bender | 257/417 |
| 6,229,190 B1 | | 5/2001 | Bryzek et al. | 257/419 |
| 6,845,664 B1 | * | 1/2005 | Okojie | 73/431 |
| 6,923,069 B1 | | 8/2005 | Stewart | 73/723 |
| 6,945,110 B2 | | 9/2005 | Selvakumar et al. | 73/514.16 |

FOREIGN PATENT DOCUMENTS

WO      WO 03/008921 A1     1/2003

* cited by examiner

*Primary Examiner*—Andre J. Allen
(74) *Attorney, Agent, or Firm*—Kermit D. Lopez; Luis M. Ortiz

(57) ABSTRACT

A pressure sensor apparatus and method that incorporates a silicon frit bonded cap. The pressure sensor includes a silicon sensor wafer with diaphragms at a bottom surface thereof, a silicon cap wafer mounted on the topside of each sensor wafer, a plurality of silicon sensor die formed on the sensor wafer, a silicon cap wafer etched to create a plurality of reference cavities on the topside of the diaphragm, a thin glass frit to form a wafer-to-wafer bond between the sensor wafer and cap wafer. Sensing devices such as semiconductor die/sensor, peizoresistors, can be used to sense the pressure. The wafer-to-wafer frit bonding improves the output signal drift and the thermal performance of the pressure sensor minimizes the thermal mismatch created by anodic bonded glass wafers.

20 Claims, 5 Drawing Sheets

PRESSURE SENSOR WITH SILICON FRIT BONDED CAP

TECHNICAL FIELD

Embodiments are generally related to sensor devices and components. Embodiments are also related to pressure sensors, and more particularly to pressure sensors that incorporate the use of a silicon frit bonded cap to create a reference pressure in the cavity on the top side of the diaphragm.

BACKGROUND OF THE INVENTION

Pressure sensors find a variety of industrial and commercial applications, such as automotive vehicles, hydraulic systems, engine testing, and so forth. Gage pressure sensors, vacuum pressure sensors, differential pressure sensors, absolute pressure sensors and barometric pressure sensors, for example, represent different types of pressure sensors widely accepted in industry today. Depending on particular aspects of their characteristics, each one of these sensor types can be used for a different application. Such devices can be adapted for use for, example, with high-accuracy pressure measurements in hostile media, such as corrosive liquids and gases and hence, need to be robust, reliable while maintaining a long lifetime with greater corrosion resistance.

Some pressure sensors use dry air as the pressure media. Media other than dry air often produces adverse effects, however, on the sensor's performance and long-term stability. For example, a known compensated semiconductor pressure sensor has been adapted for use as a fluid media compatible integrated pressure sensor. Such a device generally includes a sensor capsule, a semiconductor die, a diaphragm region responsive to applied pressure, an outer frame region, a stress isolation region to couple the rim region to the outer frame region, and a silicon cap bonded to the outer frame region of the semiconductor die to cover the diaphragm region. Such a sensor, however, lacks the ability to interact properly with fluid media as well as gaseous media and also faces drawbacks such as corrosion.

Another type of known pressure sensor is based on the formation of a topside reference cavity for a pressure sensor. Such a device includes a silicon diaphragm having bottom and top surface and media being applied to the bottom surface. The cap is glass such as Pyrex and is attached by anodic bonding. The media pressure is sensed by the pressure sensor in relation to the reference pressure sealed on the topside of the diaphragm. This device, however, faces some major problems like output signal drift.

A further known semiconductor pressure sensor includes a first semiconductor layer that forms a base, an insulating layer formed on the first semiconductor layer, a second semiconductor layer formed on the insulating layer and a diaphragm portion constituting a pressure-sensitive region. The methods of formation of the layers for such a device are difficult to use in harsh media such as fluid media or gaseous media.

Pressure sensors should be compatible with fluid media as well as gaseous media if such devices are to work efficiently and with the greatest possible accuracy. Such pressure sensors should ideally be able to operate with improved thermal expansion matching and improved signal output drift. Therefore, there is a need for a pressure sensor that overcomes the aforementioned drawbacks.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is therefore one aspect of the present invention to provide for an improved sensor.

It is another aspect of the present invention to provide for an improved pressure sensor.

It is a further aspect of the present invention to provide a pressure sensor that incorporates the use of a silicon frit bonded cap to create a reference pressure on the top side of the diaphragm.

It is yet another aspect of the present invention to provide a pressure sensor with an improved thermal performance and improved output signal drift.

The aforementioned aspects and other objectives and advantages can now be achieved as described herein. A pressure sensor apparatus is disclosed, which includes a silicon sensor wafer with a plurality of sensors formed using techniques familiar to those skilled in the art and a silicon cap wafer with a plurality of caps etched to form a reference pressure cavity on the top side of the diaphragm when frit bonded to the silicon sensor wafer thereby forming a plurality of sensor die with a top side reference pressure cavity a thin glass frit used to form a wafer-to-wafer bond between the silicon sensor wafer and silicon cap wafer, and a mechanism for sensing the pressure. The mechanism for sensing the pressure can include sensing devices such as peizoresistors, etc. The pressure sensor further includes holes in the silicon cap wafer to accommodate wire bond pads for each of the plurality of sensor die formed on the sensor wafer and for effective connection with the sensing means.

In one embodiment, a method of fabricating the pressure sensors and wafer-to-wafer frit bonding of the cap wafer can be implementing. Such a methodology includes steps of providing a silicon substrate with a backside etched diaphragm, deposit a first layer of some material on the top side of the substrate, depositing a second layer of a material different from the first layer, etching holes in the second layer, removing the first layer from under the second layer through the holes in the second layer to create a reference cavity on the topside of the diaphragm, depositing a third layer on the second layer sealing the holes and creating the reference pressure cavity. The second and third layers together form the cap.

In another but preferred embodiment, the silicon cap wafer can be aligned and frit bonded to the sensor wafer to form the reference pressure cavities. The wafer-to-wafer frit bonding improves the output signal drift and thermal performance of the pressure sensor minimizing the thermal mismatch created by anodic bonded glass wafers.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION OF EMBODIMENTS

The particular values and configurations discussed in these non-limiting examples can be varied and are cited merely to illustrate at least one embodiment and are not intended to limit the scope thereof.

An exemplary embodiment provides a method to enable the user to detect pressure with respect to the reference pressure sealed in the top side cavity created by the cap. The method described below presents an apparatus to measure the pressure, which includes silicon (silicon) sensor wafers, silicon (silicon) cap wafers, a plurality of sensor die made of silicon (silicon) material.

Figure 1:
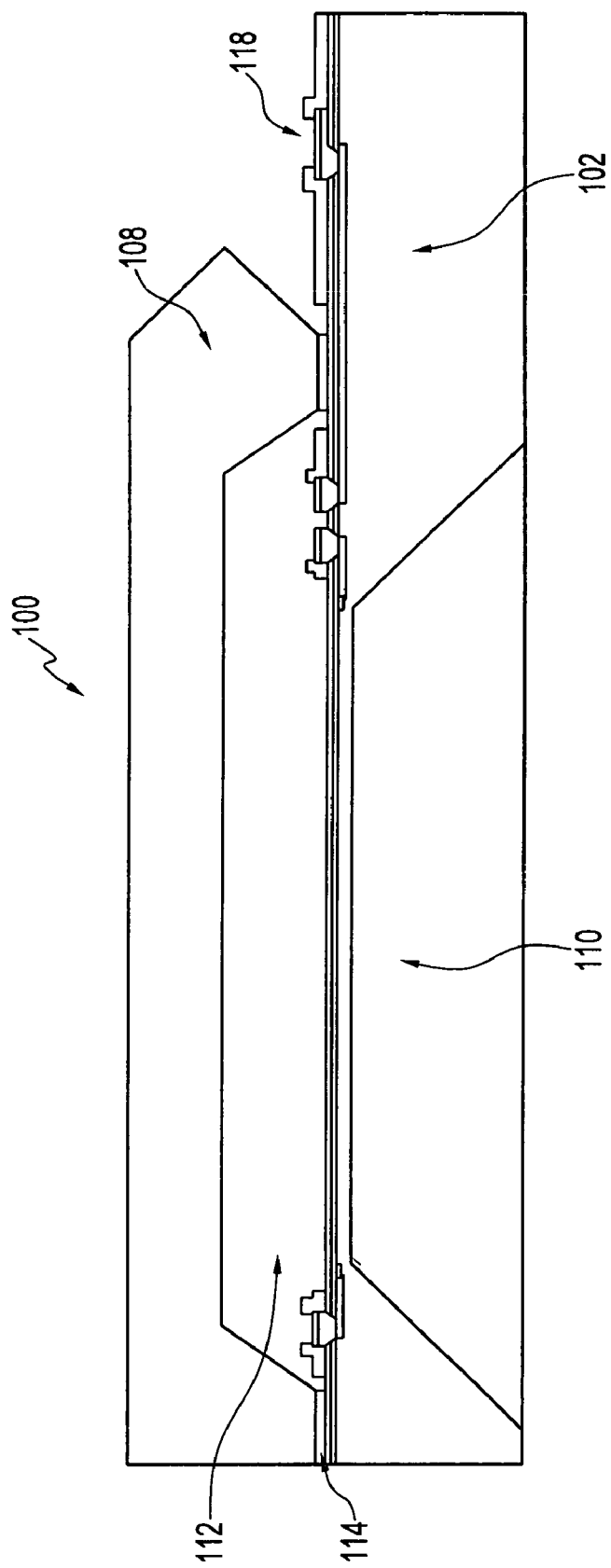
FIG. 1 illustrates a front cross-sectional view of a pressure sensor illustrating a silicon cap wafer frit bonded to a silicon sensor wafer, in accordance with a preferred embodiment.

FIG. 1 illustrates a front cross-sectional view of a pressure sensor 100 that includes a silicon sensor wafer 102 formed by methods known to those skilled in the art, a silicon sensor die 104 (not shown in the FIG. 1) for sensing the pressure and a silicon cap wafer 106 in accordance with a preferred embodiment. A diaphragm 110 is formed on the back side of the silicon sensor wafer 102 using methods known to those skilled in the art. The pressure of the harsh and/or fluid media to be measured is applied on the backside/bottom surface of the diaphragm 110. The top side of diaphragm 110 is covered by the cap 108 made of silicon to create the reference pressure cavity 112.

The diaphragm 110 further includes sidewalls and a determined diaphragm thickness and length. By reducing the diaphragm length and the circuitry area, a smaller die size can be obtained. A duck under 126 to connect the metal runners 122 and 125 can be configured by methods known to those skilled in the art. The reference cavity 112 present on the topside of the diaphragm 110 provides the reference pressure for the pressure sensor.

The reference cavity 112 seals the topside of diaphragm 110 of the sensor die 104 on the sensor wafer 102. A thin glass frit 114 is used to bond the silicon cap wafer 106 with the silicon sensor wafer 102 to form a frit bond area 120. The silicon cap wafer 106 must be properly aligned to the silicon sensor wafer 102 before bonding them.

According to an embodiment, frit bonding the silicon cap wafer 106 to the silicon sensor wafer 102 minimizes the thermal mismatch created by an anodic bonded glass wafer. The bonding of materials is highly desired for high performance devices. Depending on the particular application, the quality of a bonding method is judged on the criteria such as bonding precision, mechanical strength, optical properties, and thermal properties. Frit bonding is done at a much higher temperature than the operating temperature of the sensor, which creates a high-temperature rated interface. This interface is mechanically strong. Frit bond area 120 creates good coefficient of thermal expansion (CTE) matching with the bonded sensor wafer 104 at room temperature and thus helps to improve the output signal drift and thermal expansion matching. Wire bond pads 118 are formed on the topside of the sensor die 104. The wire bond pads 118 are electrically connected to the sensing devices 124 such as piezoresistors, etc. by metal runners 122, 125 on the top side of sensor die 104 and duck unders 126 which run below the top surface of sensor die 104 and under the frit bond area 120.

Figure 2:
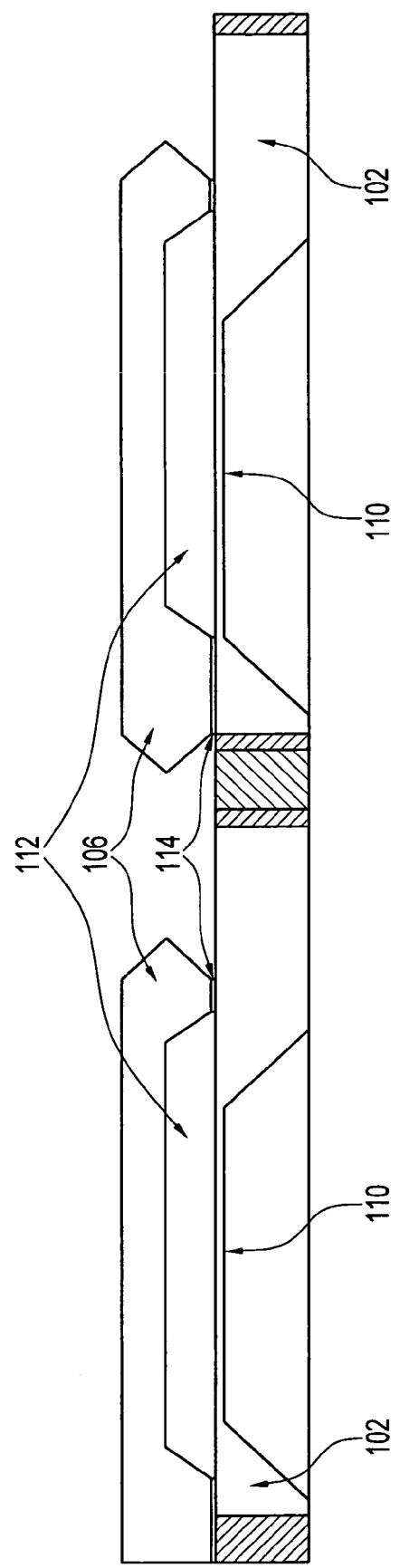
FIG. 2 illustrates a front cross-sectional view of a pressure sensor comprising of a plurality of silicon sensor wafer bonded with silicon cap wafer, in accordance with a preferred embodiment.

FIG. 2 illustrates a plurality of pressure sensors 100 consisting of a silicon sensor wafer 102, silicon sensor die 104 (shown in FIG. 3), and silicon cap wafer 106 frit bonded to the silicon sensor wafer 102 according to the preferred embodiment.

Figure 3:
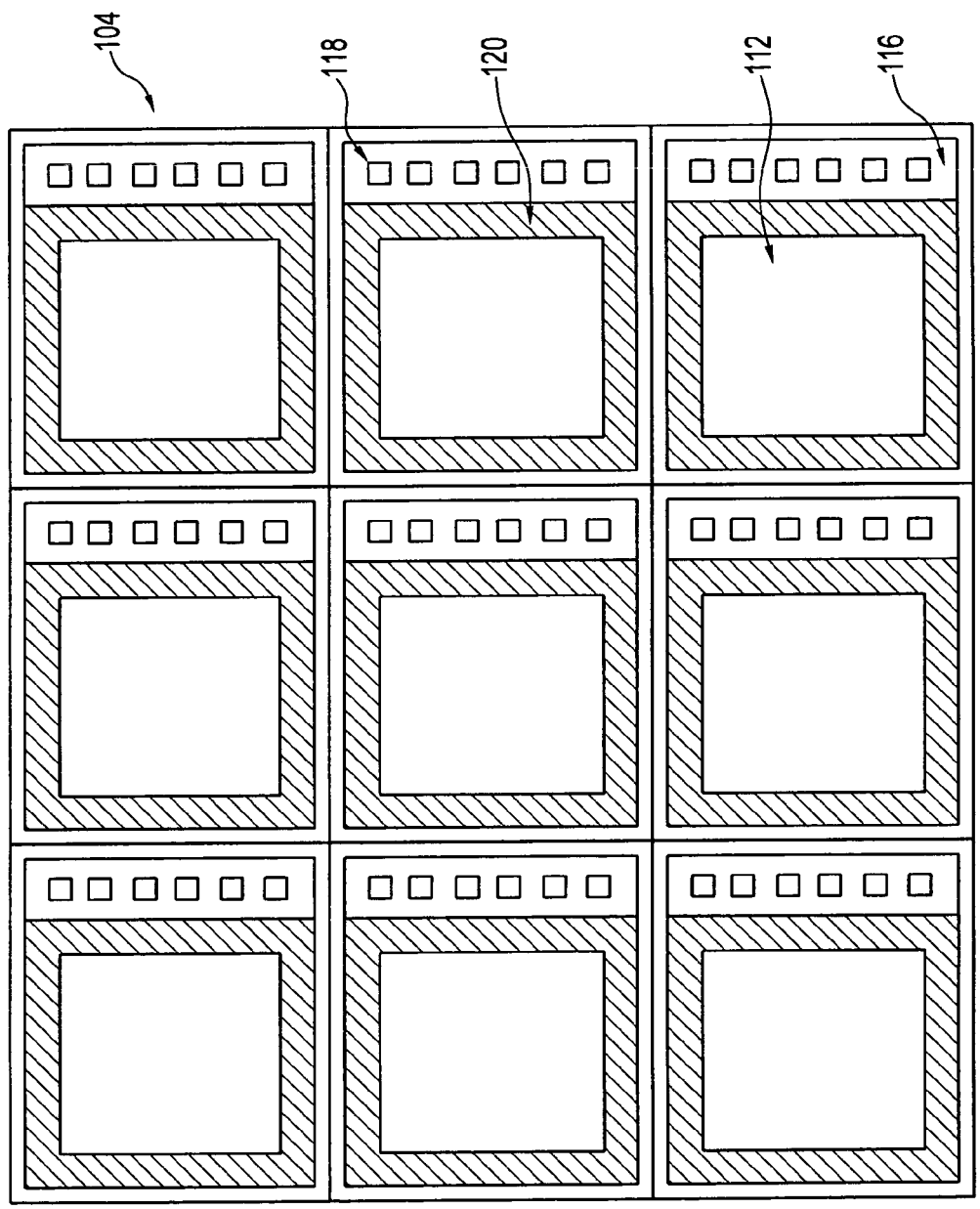
FIG. 3 illustrates a horizontal cross-sectional view of the pressure sensors of FIG. 2, comprising a plurality of silicon sensor die mounted on a silicon sensor wafer, in accordance with a preferred embodiment.

FIG. 3 illustrates a horizontal cross-sectional view of the pressure sensor 100, in accordance with the preferred embodiment. The figure shows a plurality of silicon sensor die 104 formed on the silicon sensor wafer 102. The silicon sensor die 104 includes frit bond area 120 formed by thin glass frit 114 during wafer-to-wafer frit bonding of the silicon cap wafer 106 (shown in FIG. 1) with the silicon sensor wafer 102. A plurality of holes 116 are formed on the silicon cap wafer 106 during the fabricating process of the cap wafer 106 which will align to the plurality of sensor die on the sensor wafer 102 thereby creating the sensor die 104. The holes 116 in the silicon cap wafer 106 provide access to the wire bond pads 118 that provide electrical connections to the sensing devices.

Figure 4:
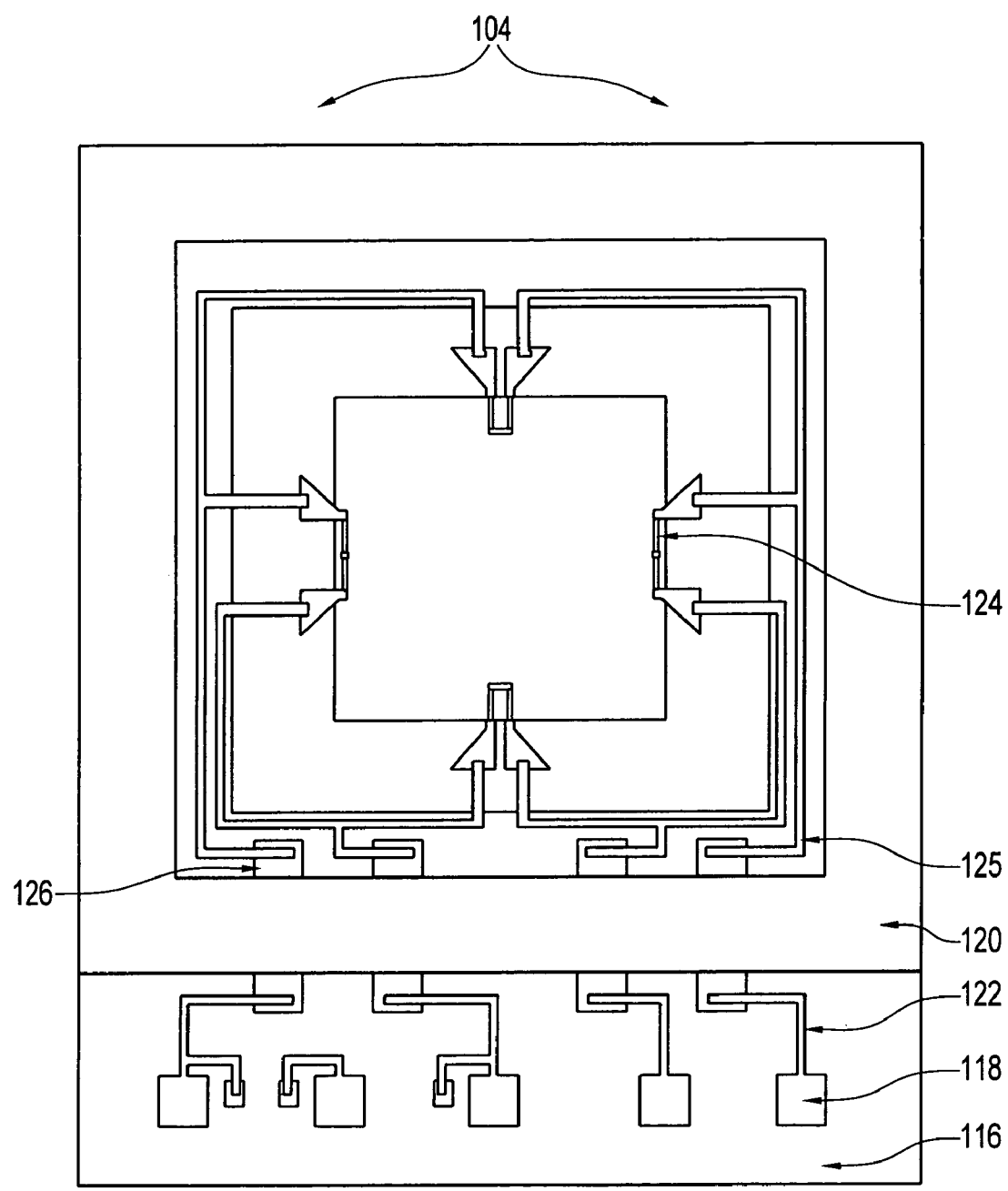
FIG. 4 illustrates of a single silicon sensor die of FIG. 3, in accordance with a preferred embodiment.

FIG. 4 illustrates a single sensor die 104 of FIG. 3, in accordance with the preferred embodiment. The silicon sensor die 104 consists of one of a plurality of pressure sensor die formed on the silicon sensor wafer 102 using methods known to those skilled in the art. The silicon sensor die has wire bond pads 118 formed on the top surface which provide electrical connection to the sensing devices 124 through metal runners 122, 125 formed on the top surface and duck unders 126 which are formed under the top surface and pass under the frit bond area 120. The silicon die 104 has a cap 108 that is frit bonded when the silicon cap wafer 106 is bonded to the silicon sensor wafer 102 using the thin glass frit 114 forming the frit bond area 120. One of the plurality of reference cavities 112 which were formed in the silicon cap wafer 106 now surrounded by the frit bond area 120 provide the sealed reference cavity over the diaphragm. One of the plurality of holes 116 which were formed in the silicon cap wafer 106 now provide access to the wire bond pads 118 on the silicon sensor die 104.

Figure 5:
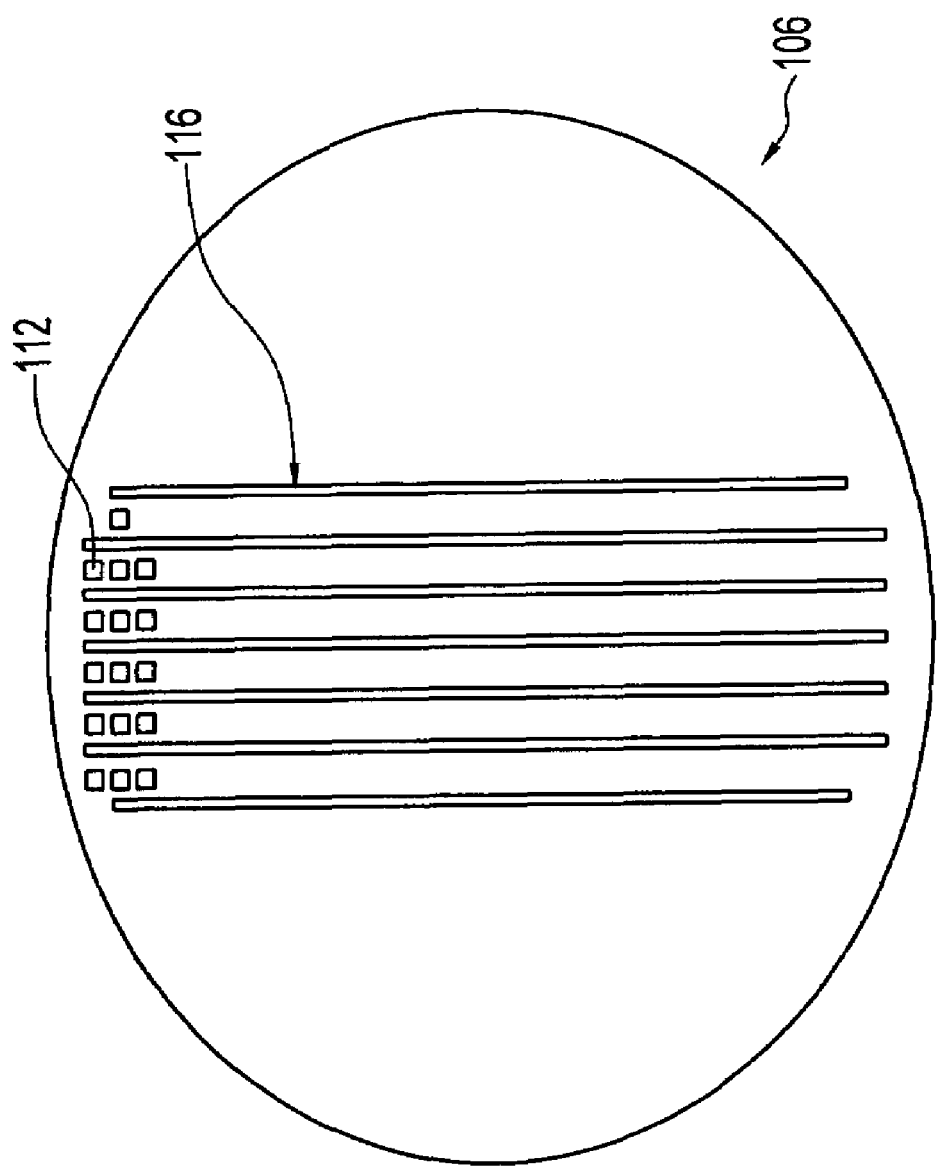
FIG. 5 illustrates a patterned silicon wafer cap, in accordance with an embodiment.

FIG. 5 illustrates a patterned silicon cap wafer 106, which covers the silicon sensor wafer 102 and thus protects the topside of the sensor die 104 from harsh media.

According to the preferred embodiment, the back side of diaphragm 110 must be exposed to the media for measurement, recording and analysis. Electronic systems used for obtaining measurements from a sensor for further analysis and recording are well known to those skilled in the art. The backside of the diaphragm 110 is exposed to the media and the pressure sealed in the cavity 112 on the topside of the diaphragm 110 is used as a reference pressure to measure the media pressure. During operations, the media is applied to the bottom surface of the diaphragm 110. The present method exposes only the silicon backside to the media which can be corrosive such as auto exhaust fumes. This novel method provides a more robust and reliable sensor by preventing the topside of the sensor die 104 from harsh/corrosive media. Frit bonding further improves the signal output drift and thermal expansion matching as described earlier.

Note that FIGS. 1–5 also generally illustrate a method for forming a pressure sensor apparatus. In general, FIGS. 1–5 indicate that a sensor wafer can be configured to include a plurality of diaphragms on a lower surface of said sensor wafer, wherein said diaphragm includes a topside and a bottom side. A plurality of sensor die can be formed on said sensor wafer. A step can then be performed in which a one or more cap die are etched on a cap wafer to create a reference cavity on said topside of said diaphragm. A step can also be processed in which a thin glass frit is configured to form a wafer-to-wafer frit bond area between said cap wafer and said sensor wafer, wherein said cap wafer is aligned and bonded to said sensor wafer using said thin glass frit to improve thermal performance of said pressure sensor, while minimizing a thermal expansion mismatch and improving the output signal drift of said pressure sensor.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A pressure sensor apparatus, comprising:
   a sensor wafer configured to include a plurality of diaphragms on a lower surface of said sensor wafer, wherein said diaphragm includes a topside and a bottom side;
   a plurality of sensor die formed on said sensor wafer;
   a plurality of cap die etched on a cap wafer to create a reference cavity on said topside of said diaphragm;
   a thin glass frit that forms a wafer-to-wafer frit bond area between said cap wafer and said sensor wafer, wherein said cap wafer is aligned and bonded to said sensor wafer using said thin glass frit to improve thermal performance of said pressure sensor, while minimizing a thermal expansion mismatch and improving the output signal drift of said pressure sensor.

2. The apparatus of claim 1 wherein said cap wafer comprises silicon.

3. The apparatus of claim 1 wherein said sensor wafer comprises silicon.

4. The apparatus of claim 1 wherein said cap wafer is configured to include holes that provides electrical connections to each die on said sensor wafer among said plurality of sensor die.

5. The apparatus of claim 4 further comprising a plurality of wire bond pads formed on said topside of the said diaphragm, wherein the said plurality of wire bond pads are connected to a plurality of sensing mechanisms utilizing bonds through said holes.

6. The apparatus of claim 5 wherein at least one sensing mechanism among said plurality of sensing mechanisms comprises said plurality of sense die.

7. The apparatus of claim 6 wherein said plurality of sense die comprise sensor piezoresistors, etc.

8. The apparatus of claim 1 wherein said diaphragm formed below said substrate is responsive to an applied pressure.

9. The apparatus of claim 1 wherein said cap wafer seals a reference pressure located on said topside of said diaphragm to each sense die among said plurality of sense die and protects said plurality of sense die from harsh media.

10. A pressure sensor apparatus, comprising:
    a sensor wafer configured to include a plurality of diaphragms on a lower surface of said sensor wafer, wherein said diaphragm includes a topside and a bottom side, wherein said sensor wafer comprises silicon;
    a plurality of sensor die formed on said sensor wafer;
    a plurality of cap die etched on a cap wafer to create a reference cavity on said topside of said diaphragm, wherein said cap wafer comprises silicon;
    a thin glass frit that forms a wafer-to-wafer frit bond area between said cap wafer and said sensor wafer, wherein said cap wafer is aligned and bonded to said sensor wafer using said thin glass frit to improve thermal performance of said pressure sensor, while minimizing a thermal expansion mismatch and improving the output signal drift of said pressure sensor, and wherein said cap wafer is configured to include holes that provides electrical connections to each die on said sensor wafer among said plurality of sensor die.

11. The apparatus of claim 10 further comprising a plurality of wire bond pads formed on said topside of the said diaphragm, wherein the said plurality of wire bond pads are connected to a plurality of sensing mechanisms utilizing bonds through said holes.

12. The apparatus of claim 11 wherein at least one sensing mechanism among said plurality of sensing mechanisms comprises said plurality of sense die.

13. The apparatus of claim 12 wherein said plurality of sense die comprise sensor piezoresistors, etc.

14. The apparatus of claim 10 wherein said diaphragm formed below said substrate is responsive to an applied pressure.

15. The apparatus of claim 10 wherein said cap wafer seals a reference pressure located on said topside of said diaphragm to each sense die among said plurality of sense die and protects said plurality of sense die from harsh media.

16. A method for forming a pressure sensor apparatus, comprising:
    configuring a sensor wafer configured to include a plurality of diaphragms on a lower surface of said sensor wafer, wherein said diaphragm includes a topside and a bottom side;
    forming a plurality of sensor die on said sensor wafer;
    etching a plurality of cap die on a cap wafer to create a reference cavity on said topside of said diaphragm;
    configuring a thin glass frit to form a wafer-to-wafer frit bond area between said cap wafer and said sensor wafer, wherein said cap wafer is aligned and bonded to said sensor wafer using said thin glass frit to improve thermal performance of said pressure sensor, while minimizing a thermal expansion mismatch and improving the output signal drift of said pressure sensor.

17. The method of claim 1 further comprising configuring said cap wafer to comprise silicon.

18. The method of claim 1 further comprising configuring said sensor wafer to comprise silicon.

19. The method of claim 1 further comprising configuring said cap wafer to include holes that provides electrical connections to each die on said sensor wafer among said plurality of sensor die.

20. The method of claim 19 further comprising forming a plurality of wire bond pads on said topside of the said diaphragm, wherein the said plurality of wire bond pads are connected to a plurality of sensing mechanisms utilizing bonds through said holes.

* * * * *